United States Patent

[11] 3,553,493

[72] Inventor De Witt H. Miller
Waynesboro, Va.
[21] Appl. No. 628,378
[22] Filed Apr. 4, 1967
[45] Patented Jan. 5, 1971
[73] Assignee General Electric Company
a corporation of New York

[54] APPARATUS FOR SIMULTANEOUSLY FIRING ARRAYS OF CONTROLLED SEMICONDUCTOR DEVICES
7 Claims, 2 Drawing Figs.

[52] U.S. Cl. .......... 307/252, 307/284, 307/305
[51] Int. Cl. .......... H03k 17/00
[50] Field of Search .......... 307/252, 252D, 305, 284; 336/183, 184; 323/48

[56] References Cited
UNITED STATES PATENTS

| | | | |
|---|---|---|---|
| 3,267,290 | 8/1966 | Diebold | 307/252 |
| 3,281,645 | 10/1966 | Spink | 307/252 |
| 3,386,027 | 5/1968 | Kilgore et al | 307/252 |
| 2,356,558 | 8/1944 | Bahring | 336/183X |
| 2,615,067 | 10/1952 | Bridges | 336/183X |
| 3,360,754 | 12/1967 | Gerdiman | 336/183X |
| 3,363,165 | 1/1968 | Wilkinson | 336/183X |

*Primary Examiner*—Donald D. Forrer
*Assistant Examiner*—B. P. Davis
*Attorneys*—George V. Eltgroth, Michael Masnik, Stanley C. Corwin, Frank L. Neuhauser, Oscar B. Waddell and Melvin M. Goldenberg

ABSTRACT: In order to simultaneously fire SCR's comprising a series/parallel array, a pulse transformer is utilized which has one or more primary windings and a plurality of secondary windings equally coupled to the primary magnetic circuit. The primary windings are energized by a selected master control gating SCR controlled in turn by a suitable regulator. The secondary windings simultaneously pulse control electrodes of power SCR's in the series/parallel array. A single master control gating SCR may energize a plurality of pulse transformers to control larger or separate arrays. Smooth transition from one master control gating SCR/regulator combination to another is achieved by nulling the anode voltages of the respective SCR's prior to the change.

INVENTOR.
DE WITT H. MILLER

BY

HIS ATTORNEY

INVENTOR.
DE WITT H. MILLER

BY Stanley C. Corwin
HIS ATTORNEY

APPARATUS FOR SIMULTANEOUSLY FIRING ARRAYS OF CONTROLLED SEMICONDUCTOR DEVICES

BACKGROUND OF THE INVENTION

This invention relates to firing circuits for semiconductor devices and, more particularly, to firing circuits for turning on series/parallel arrays of power SCR's substantially simultaneously.

In the past, firing arrays of silicon controlled rectifiers has typically been achieved by utilizing slave firing techniques in which a just-turned-on SCR delivers, after a short delay, a turn-on pulse to another SCR which, in turn, triggers yet another SCR and so on until all the SCR's in the array are conducting. Slave firing was used because other firing circuits for firing SCR arrays were not fast enough to provide steep wave fronts required for sufficiently nearly simultaneous firing. With the apparatus of the present invention, series/parallel combinations of SCR's may be simultaneously brought to a firing level in less than one microsecond to provide a relatively balanced load share among the several power SCR's in an array without using slave firing with its inherent delay and circuit complexity.

It is an object of this invention to provide a circuit for simultaneously firing a plurality of controlled switch devices.

It is another object of this invention to provide apparatus for firing series/parallel arrays of power SCR's in a plurality of power rectifier units simultaneously and utilizing common master control gating SCR's.

This and other objects of the invention are achieved by providing one or more selectable master control gating SCR's which are each controlled by an external regulator, either DC or AC. When the master control gating SCR fires, the one or more primary windings of a pulse transformer are energized from a half-wave rectified AC source and a storage capacitor. Secondary windings, which have equal magnetic coupling with the primary windings, and, in addition, are sector wound to minimize interwinding capacitance between the windings are connected, through transient and overvoltage protective networks, to control electrodes of each SCR in a series/parallel array of power SCR's. The storage capacitor is utilized in conjunction with the pulse transformer electrical primary circuit to assist firing at phase angles at which the pulse amplitude would otherwise be unacceptably small. A plurality of identical power rectifier units can be driven by a single master control gating SCR unit.

The subject matter of the invention is particularly pointed out and distinctly claimed in the concluding portion of the specification. The invention, however, both as to organization and method of operation, may best be understood by reference to the following description of an exemplary embodiment taken in connection with the accompanying drawings, of which:

Figure 1:
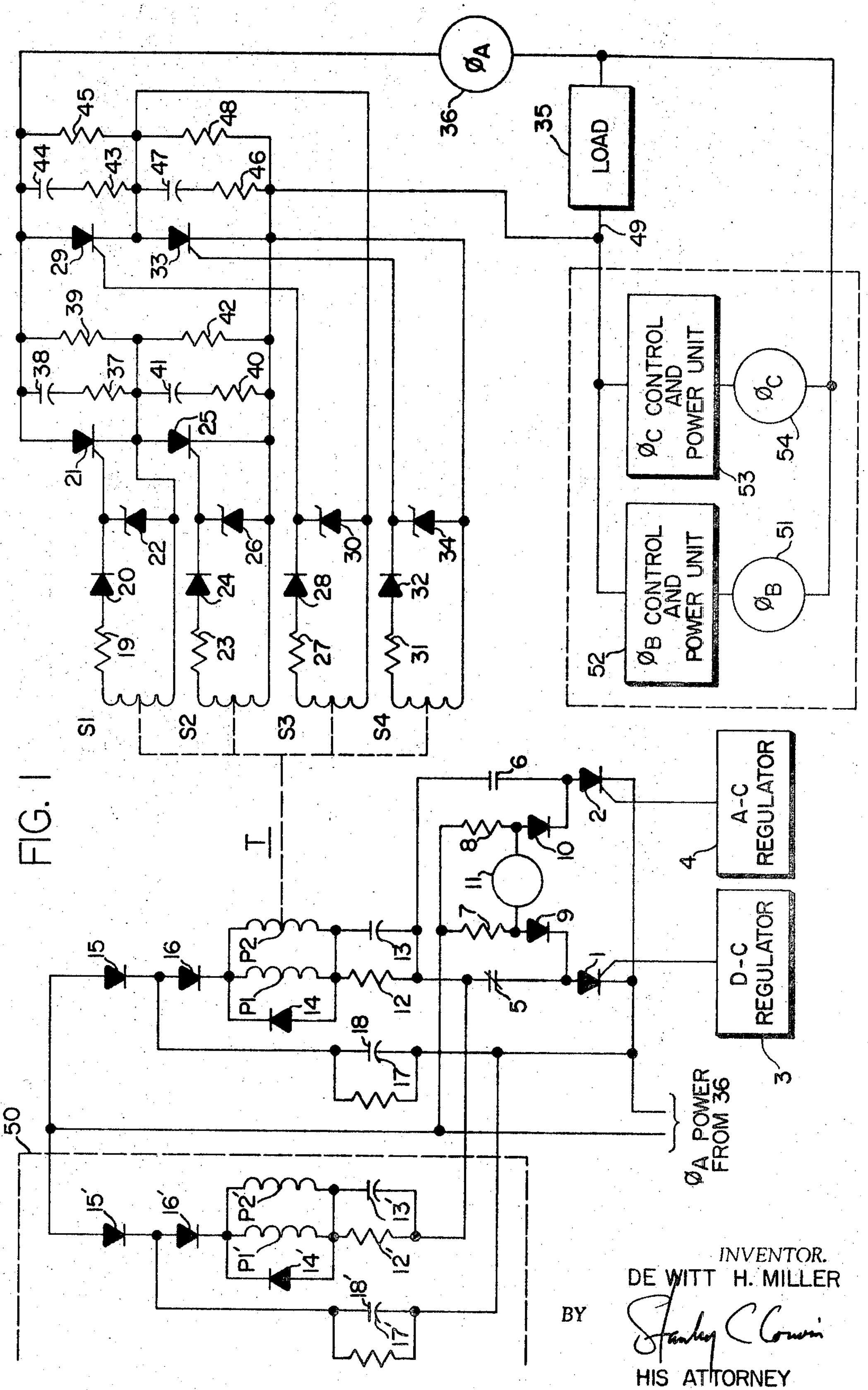
FIG. 1 is a circuit diagram of a preferred form of the invention.

Referring now to the schematic diagram of FIG. 1, it will be observed that two master control gating silicon controlled rectifiers (SCR's) 1 and 2 are each disposed in series with a circuit including primary windings P1 and P2 of a pulse transformer T across an AC power source of a first phase, Phase A, with their cathode electrodes connected to one side of the AC power source. The control electrodes of the SCR's 1 and 2 are connected to a DC regulator 3 and an AC regulator 4, respectively. The DC regulator 3 and the AC regulator 4 are interchangeable according to the position of complementary contacts 5 and 6 of an external relay which is not shown. Resistors 7 and 8 and rectifiers 9 and 10 are electrically disposed in shunt with the circuit containing the primary windings P1 and P2 of the transformer T and in series with the master control gating SCR's 1 and 2. A meter 11 is connected between the junction of the resistor 7 and the rectifier 9 and the junction of the resistor 8 and the rectifier 10. The purpose of this meter and its associated components will be explained below.

A pulse-shaping circuit comprising a resistor 12 and a capacitor 13 in parallel is disposed in series between the master control gating SCR's 1 and 2 and the primary windings P1 and P2 of the pulse transformer T. Another rectifier 14 is connected in parallel with the primary windings P1 and P2 and is polarized to conduct in the opposite direction from the master control gating SCR's 1 and 2. Two additional rectifiers 15 and 16 complete the series circuit to the other side of the AC power source. The rectifiers 15 and 16 are polarized to conduct in the same direction as the master control gating SCR's 1 and 2.

A storage circuit comprising a resistor 17 and a capacitor 18 is connected between the cathode side of the master control gating SCR's 1 and 2 and the junction between the cathode of the rectifier 16 and the anode of the rectifier 15.

The pulse transformer T has four secondary windings: S1, S2, S3, and S4. One side of each of the four secondary windings is connected through a series resistor and rectifier to the control electrode of one of four power SCR's, and the other side of a given secondary winding is connected directly to the cathode of the same power SCR. A Zener diode is disposed between the control and cathode electrodes of each power SCR. In the secondary circuit of the secondary winding S1, for example, the resistor 19, the rectifier 20, and the Zener diode 22 comprise the interconnection network between the secondary winding S1 and the power SCR 21. Like components for the power SCR 25 are the resistor 23, rectifier 24, and the Zener diode 26; for the power SCR 29, the resistor 27, the rectifier 28, and the Zener diode 30; and for the power SCR 33, the resistor 31, the rectifier 32, and the Zener diode 34.

As shown in FIG. 1, the four power SCR's 21, 25, 29, and 33 are disposed in a series/parallel array. Power SCR's 21 and 25 are in series with a load 35 across a source of Phase A power 36. Similarly, power SCR's 29 and 33 are in parallel with the power SCR's 21 and 25 and in series with the load 35 and the Phase A power source 36. A series R/C circuit comprising a relatively low value resistor 37 and a capacitor 38 is connected from the cathode to the anode of the power SCR 21; in addition, a relatively high value resistor 39 is disposed in parallel with the R/C circuit 37 and 38. Equivalent circuits are placed across the power SCR's 25, 29, and 33 comprising, respectively, relatively low value resistor 40, capacitor 41, and relatively high value resistor 42; relatively low value resistor 43, capacitor 44, and relatively high value resistor 45; and relatively low value resistor 46, capacitor 47, and relatively high value resistor 48 as shown in FIG. 1.

In the operation of the Phase A portion of the circuit which is shown in detail in FIG. 1, either the DC regulator 3, which may be coupled to the load 35 and controls the phase angle of the firing of SCR's 1 and 2 to maintain a fixed voltage across the load, or the AC regulator 4, which is coupled to an AC reference voltage such as the Phase A voltage source 36 for controlling the phase angle of the firing of the SCR's 1 and 2, will ultimately control the power SCR's 21, 25, 29, and 33 according to the state of an external relay, not shown, which determines the position of the complementary relay contacts 5 and 6. Assuming that the relay contacts are in the position shown in FIG. 1, the master control gating SCR 1 will be directly in series with the pulse transformer T primary circuit such that the DC regulator 3, which may simply be a controllable source of DC voltage, controls the firing angle of the primary circuits. The master control gating SCR 1 will fire at an angle of the low voltage Phase A source voltage according to the source voltage magnitude and the control electrode voltage in the manner well known in the art. When the master control gating SCR 1 fires, a current path is completed through the series circuit including the primary windings P1 and P2 with substantially all the voltage appearing across the primary windings P1 and P2 of the pulse transformer T and the resistor 12 in series. Since the pulse transformer T must have a limited volt-second capacity, substantially the whole of this voltage will be developed across the resistor 12 as soon as the transformer saturates. The capacitor 13, disposed across the resistor 12, permits a steep pulse leading edge through the pulse transformed T by presenting a low impedance path between SCR's 1 and 2 and the primary windings P1 and P2 so that all of the voltage from source 36 initially appears across these primary windings. This provides a commensurate steep wave front in the secondary circuits and at the gate electrodes of the power SCR's 21, 25, 29, and 33.

Because the primary firing circuit operates across an AC source, the magnitude of the firing pulse delivered by the pulse transformer secondaries would vary in amplitude according to the phase angle of the primary voltage cycle at which the firing occurred. Thus, at small phase angles or when the master control SCR is fired late in the cycle, the amplitude of the pulse would be unacceptably small; on the other hand, the amplitude would be maximum at the 90 degree point of the supply voltage cycle. To preserve the magnitude of the firing pulse when the master control SCR is turned on either very early or very late in the cycle, a storage capacitor 18 is provided. The low voltage Phase A current is half-wave rectified through the rectifier 15 to charge the capacitor 18 and provide a relatively stabilized DC voltage at the anode electrode of the rectifier 16.

The firing pulses delivered to the power SCR's 21, 25, 29, and 33 pass through current limiting resistors 19, 23, 27, and 31; and isolating diodes 20, 24, 28 and 32 to prevent any possible excessive or reverse gate current. In addition, the firing pulses are voltage clamped by Zener diodes 22, 26, 30 and 34 to prevent an overvoltage condition from being developed between the gate and cathode electrodes of the power SCR's.

The series-connected capacitor and resistor disposed in shunt across each of the power SCR's provide transient voltage protection by providing a low impedance current path around the power SCR's for any high frequency transients which might occur in the controlled power network. The relatively high value resistors 39, 42, 45, and 48 insure a steady state of voltage sharing across each of the two series units.

Figure 2:
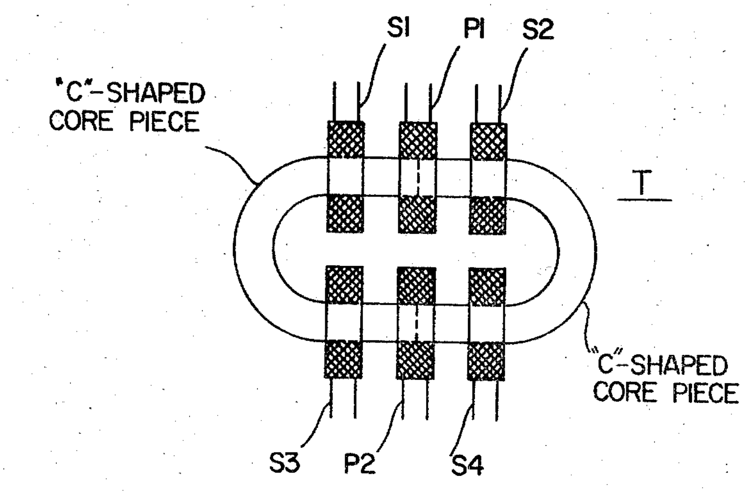
FIG. 2 is a cross-sectional representation of the pulse transformer utilized in the circuit of FIG. 1.

The configuration of the pulse transformer T contributes significantly to the equality and sharpness of the pulses delivered to the four SCR's 21, 25, 29 and 33. As illustrated in FIG. 2, the pulse transformer T comprises two abutting "C"-shaped core halves which make up a generally oval core for receiving the windings. The primaries P1 and P2 are preferably each wound midway along one of the longer sides of the oval core with each having a pair of secondary windings equally spaced from the primary winding. By placing the windings upon the transformer core as shown in FIG. 2, all the secondary windings enjoy equal coupling with the primary magnetic circuit. This provides waveforms in all the secondary windings which are virtually identical and have the requisite fast rise time characteristic. By sector winding both the primaries and the secondaries, interwinding capacitance is minimized among the secondary circuits. It is important to limit the capacitive coupling when simultaneously firing series connected SCR's because the gate circuits may transiently be at substantially different potentials. Alterations to the pulse transformer configuration to accommodate different numbers of power SCR's in a given array will be apparent to those skilled in the art.

The meter circuit comprising resistors 7 and 8 and rectifiers 9 and 10, as well as the meter 11, is utilized when transferring control of the power circuit from one regulator and its associated master control gating SCR to another regulator and its master control gating SCR. It is preferable that the oncoming circuit be preset such that its master control gating SCR is firing at the same phase angle as the master control gating SCR from which control is to be transferred so that there is no "bump" in the power circuit when the transfer is made. The resistors 7 and 8 function as dummy loads so that the master control gating SCR which is switched out of the pulse transformer T primary circuit will nonetheless always fire. The meter 11 is conveniently a zero center reading type. This meter will therefore indicate the difference voltage between the respective anodes of the master control gating SCR's 1 and 2 and will indicate zero when the two master control gating SCR's 1 and 2 are firing at the same angle. Thus, when the meter 11 reads zero, the pulse transformer T primary circuit may be transferred from one regulator to another with little or no disturbance in the output power circuit.

As shown in FIG. 1, a common master control gating circuit can be utilized to drive a plurality of pulse transformer primary windings to ultimately control a number of power secondary units in parallel to multiply the current switching capability of the system. The primary circuits of such additional units are symbolically represented by the primed numbered components within the area segregated from the heretofore explained circuitry by the dashed line 50. The number of these additional parallel power units is limited only by the current handling capacity of the master control gating SCR's through which the pulse transformer primary currents must pass.

The invention is not limited to single phase control and finds typical application in a three-phase power rectifier in which case, as shown in FIG. 1, power from Phase B 51 and Phase C 54 power sources is rectified in a controlled manner by the Phase B control units 52 and Phase C control unit 53, respectively. The control units 52 and 53 are identical to the Phase A control unit described in detail above. The combined outputs from the Phase A, Phase B, and Phase C units are connected together to the power DC bus 49 to energize the load 35.

I claim:

1. A firing circuit for simultaneously firing a plurality of controlled switch devices to couple a source of alternating current to a load comprising a pulse transformer having at least one primary winding and an associated pair of secondary windings all wound on a common, closed core, each secondary winding of said pulse transformer being symmetrically spaced with respect to its associated primary winding to effect equal magnetic coupling to said primary winding of said pulse transformer to simultaneously supply firing pulses to a respective one of said switch devices to control conduction thereof, a master control switch device coupling alternating current from said source to said primary winding of said pulse transformer, a gating circuit coupled to said master control switch device to phase control the firing thereof thereby regulating the output of said plurality of controlled switch devices.

2. A firing circuit as recited in claim 1 further including a supplemental pulse transformer and a second plurality of controlled switch devices coupling said source of alternating current to said load, said supplemental pulse transformer having at least one primary winding and a secondary winding for each controlled switch device in said second plurality of controlled switch devices and coupled to supply firing pulses thereto, each secondary winding of said supplemental pulse transformer being equally magnetically coupled to a primary winding of said supplemental pulse transformer, each primary winding of said supplemental pulse transformer being coupled to said master control switch device in parallel circuit relation to the first-named pulse transformer.

3. An arrangement according to claim 1 comprising a second primary winding and an associated second pair of secondary windings all wound on said common closed core, each of said second secondary windings adapted to control a respective switch device and coupled to supply firing pulses thereto, each second secondary winding being symmetrically spaced with respect to its associated second primary winding to effect equal magnetic coupling to said second primary winding, each of said first mentioned secondary windings being symmetrically spaced with respect to the second primary winding to effect equal magnetic coupling to said second primary winding, each of said second secondary windings being symmetrically spaced with respect to the first mentioned primary winding to effect equal magnetic coupling with said first mentioned primary winding of said pulse transformer.

4. A firing circuit as recited in claim 3 further including a capacitor circuit coupled in the primary circuit of said pulse transformer with said master control switch device to provide a steep wave front for the pulses generated by said firing circuit.

5. A firing circuit as recited in claim 4 further including a second capacitor circuit coupled across the primary circuit of said pulse transformer to preserve the magnitude of the firing pulses.

6. A multiphase power supply system comprising a plurality of firing circuits as set forth in claim 3, wherein each firing circuit controls the firing of a plurality of controlled switch devices to couple one phase of a power source to a load.

7. A firing circuit as recited in claim 3 further including a second master control switching device and a second gating circuit coupled to said second master control switch device to phase control the firing thereof to regulate the output of said plurality of controlled switch devices, and switch means disposed in the primary circuit of said pulse transformer to control which one of the master control switch devices is coupled in the primary circuit of said pulse transformer.

UNITED STATES PATENT OFFICE
CERTIFICATE OF CORRECTION

Patent No. 3,553,493 Dated January 5, 1971

Inventor(s) DeWitt H. Miller

It is certified that error appears in the above-identified patent and that said Letters Patent are hereby corrected as shown below:

Column 1, line 33, after "the" insert -- in-circuit --. Column 3 line 5, cancel "transformed" and insert -- transformer --. Column 4, line 25, cancel "units" and insert -- unit --.

Signed and sealed this 16th day of November 1971.

(SEAL)
Attest:

EDWARD M.FLETCHER,JR.
Attesting Officer

ROBERT GOTTSCHALK
Acting Commissioner of Patent